United States Patent Office 3,145,591
Patented Aug. 25, 1964

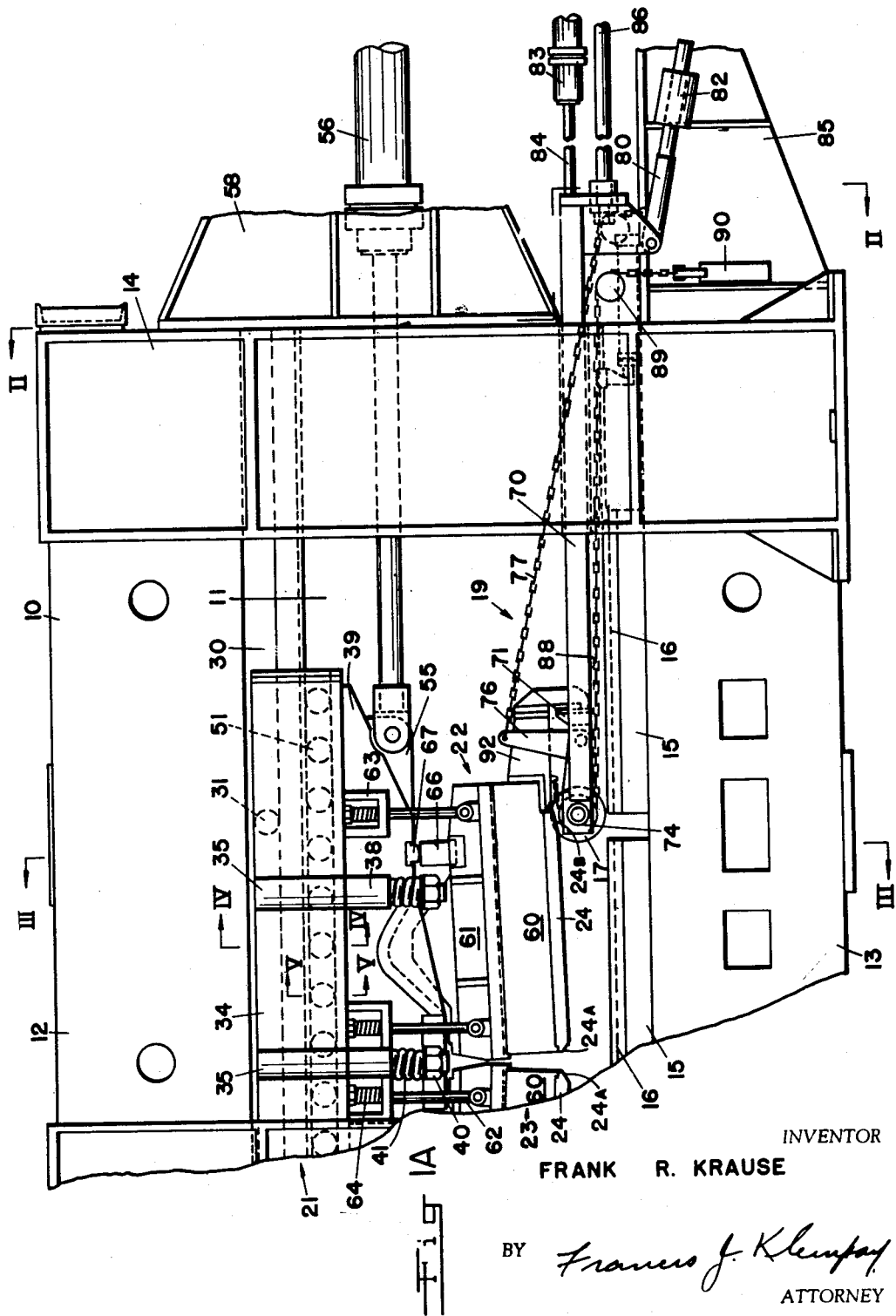

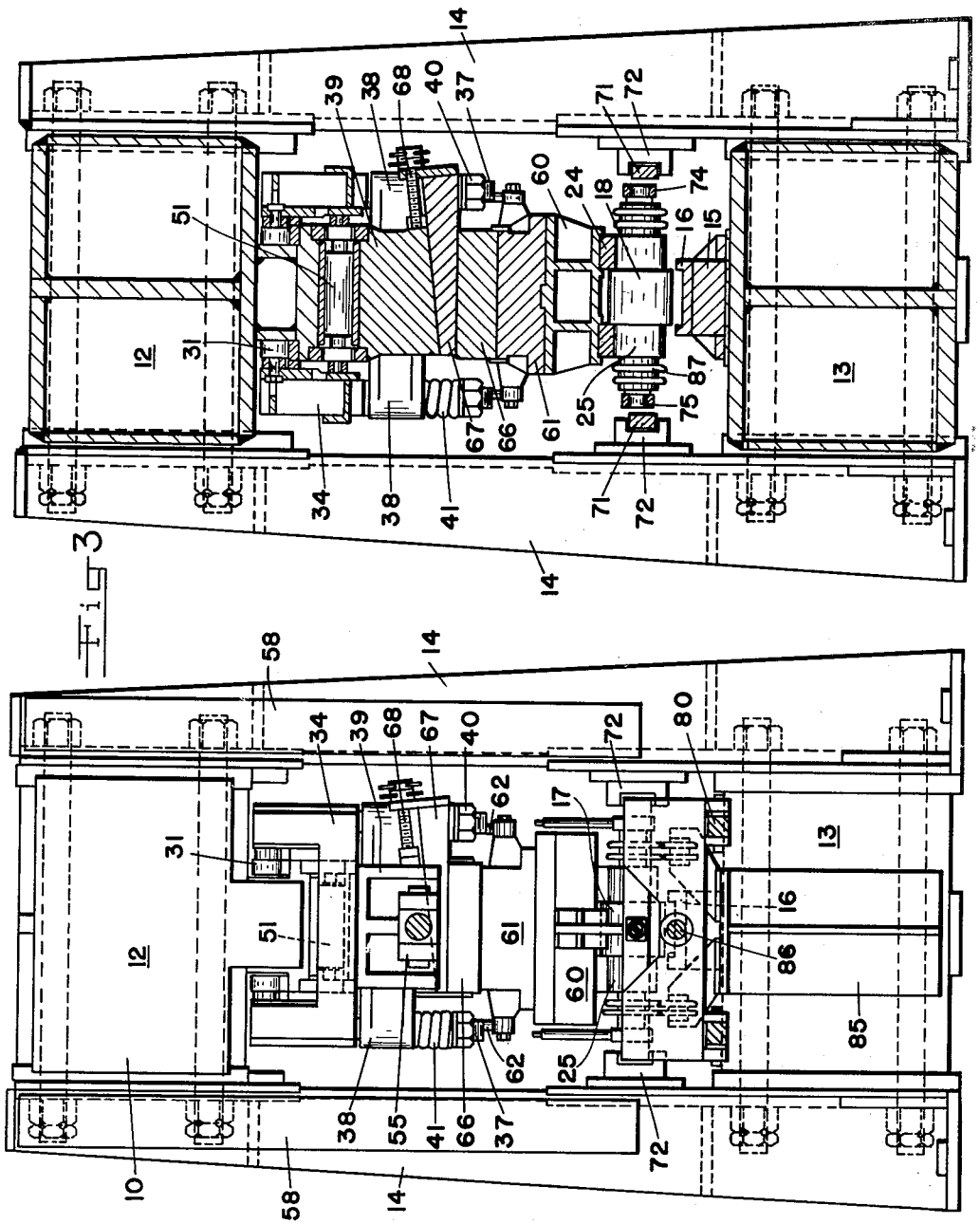

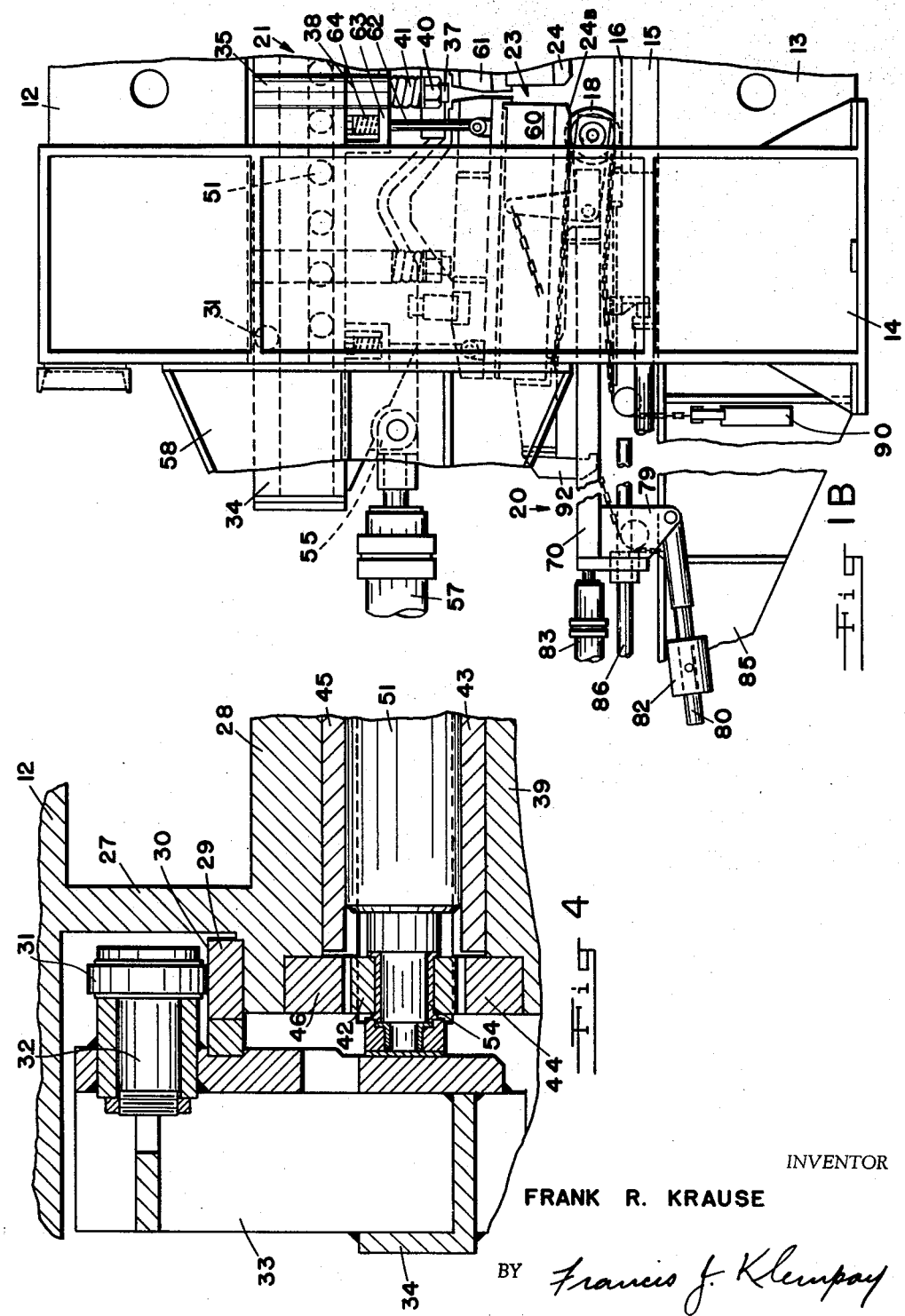

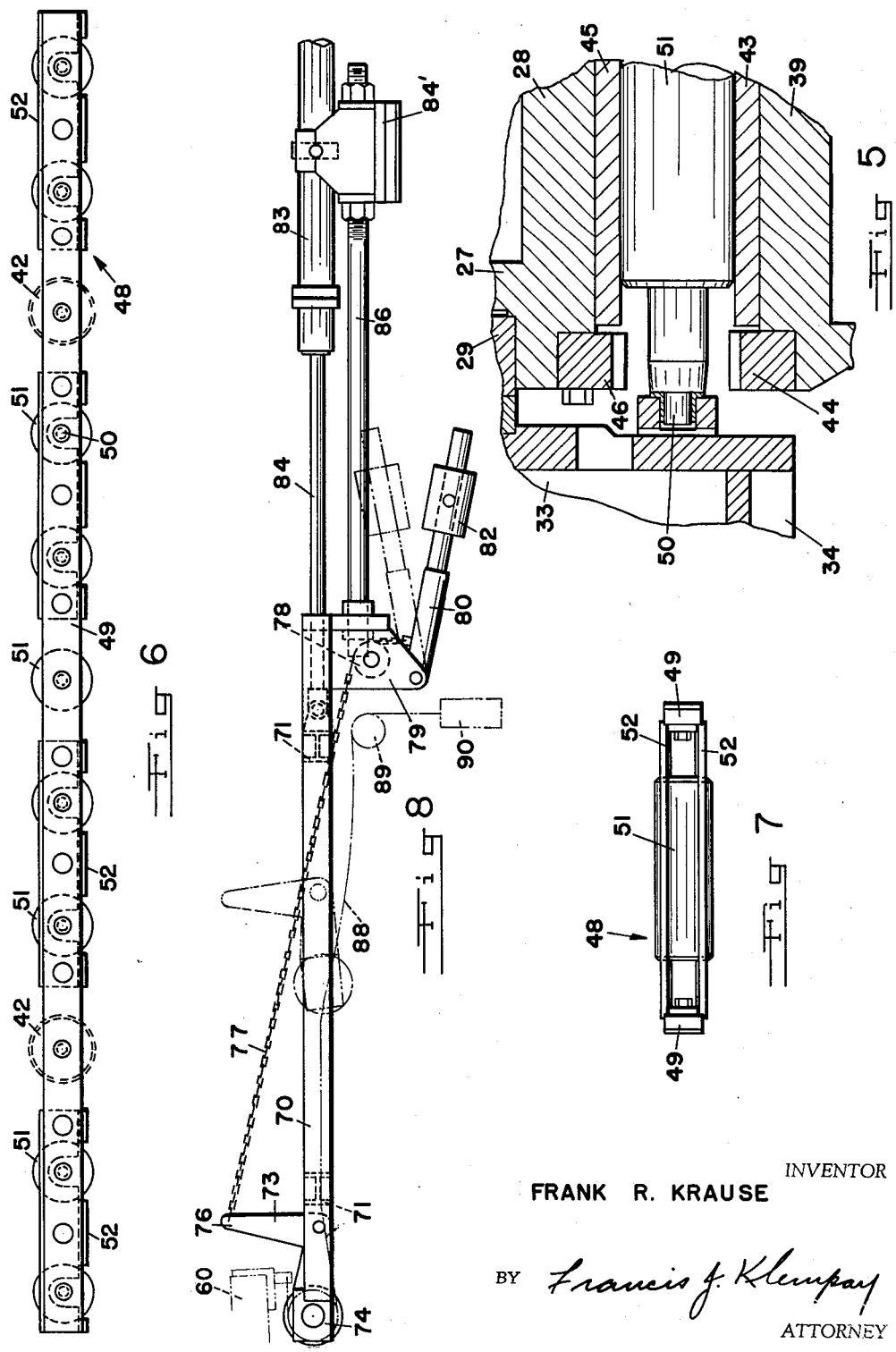

3,145,591
LEAF SPRING TAPERING APPARATUS
Frank R. Krause, 1503 Highland Ave., New Castle, Pa.
Filed Oct. 6, 1958, Ser. No. 765,656
10 Claims. (Cl. 80—19)

The present invention relates generally to metal working machinery and more particularly to novel and improved apparatus for tapering the ends of leaf springs and other like workpieces.

In the manufacture of automotive vehicles, for example, it is common to employ so-called semi-elliptical suspension springs for resiliently supporting the body or frame of the vehicle from the axles and wheel assemblies thereof. In accordance with well known prior art practice, springs of this class may comprise a plurality of arcuate spring leaves or blades mounted in superimposed relation and of diminishing length from top to bottom. More recently it has been suggested that such conventional leaf springs consisting of a plurality of laminated leaves may be replaced by a leaf spring made out of a single elongated and properly shaped leaf or blade. One important advantage of the single leaf spring as compared with the conventional laminated semi-elliptical springs is its greatly reduced weight. This is brought about by the increased operating stress and the reduction of inactive spring material. The manufacturing cost is reduced in proportion to the lower raw material weight and to the smaller number of parts to be assembled. In operation an important advantage of the single leaf spring is the elimination of static friction associated with laminated leaf springs. Spring covers and liners are not needed and the single leaf spring requires no servicing. The ride of the vehicle does not change because the variable friction is no longer present.

In order to arrive at a minimum weight a leaf spring must be designed so that the operating stresses are the same at all points throughout its length. A single leaf spring therefore is usually of constant or substantially constant width dimension and varies in thickness dimension from a maximum at the center to a minimum at points adjacent the two ends thereof. It is the primary or ultimate object of the present invention to provide apparatus specifically adapted for, although not necessarily limited to, tapering the ends of single leaf springs whereby the desired variation in thickness dimension throughout the length of the single leaf spring may be obtained.

It is another object of the present invention to provide apparatus for tapering the end portions of leaf springs and other like workpieces wherein are employed a pair of reducing rolls which are arranged to act upon a leaf spring blank to effect a progressively increasing reduction in the thickness to obtain the desired tapering characteristics. The invention, in this respect, embodies some of the basic teachings of my prior patents, of which U.S. Patent No. 2,775,152 which is assigned to assignee of the present invention may be considered representative. In the present apparatus the reducing rolls are opposed by cam back-up assemblies of progressively increasing displacement and which are adapted upon longitudinal movement of the cam back-up assemblies to roll along the surface of the leaf spring blank to effect a progressive reduction in the thickness of the blank, resulting in the desired taper.

Another object of the present invention is to provide apparatus of the character described which comprises improved means for mounting the pair of cam back-up assemblies for longitudinal movement. As will be hereinafter more fully explained, the cam back-up assemblies are independently resiliently mounted from a traveling cam carriage. The cam carriage is adapted for anti-frictional longitudinal movement while yet embodying improved and novel means for backing up and absorbing the high rolling forces exerted by the reducing rolls.

A further object of the present invention is to provide apparatus for tapering leaf springs and the like wherein the pair of reducing rolls are mounted and actuated in a manner to first taper one end of the leaf spring blank and then immediately thereafter to taper the other end of the leaf spring blank. The cam back-up assemblies are carried in longitudinally aligned relation on the longitudinally movable cam carriage and a reducing roll is provided for each end of the leaf spring blank. As the cam carriage is shuttled back and forth first one end and then the other end of the leaf spring blank is tapered. In this manner the apparatus need be designed to withstand only the forces associated with tapering one end of the leaf spring while yet substantial rates of production are maintained.

Yet another object of the invention is to provide novel means for mounting the reducing rolls whereby each of the reducing rolls is moved to an inoperative position with respect to the leaf spring as the other reducing roll is tapering its end of the leaf spring. Each of the reducing rolls is pivotally mounted on a longitudinally movable carriage and novel means are employed for pivoting the reducing rolls to an inoperative position when the same is moved back across the tapered end of the leaf spring.

A further important object of the invention is the provision of apparatus of the character described wherein the traveling cam carriage embodies means for automatically returning each of the reducing rolls to the center of the leaf spring as the other reducing roll is tapering one end of the leaf spring preparatory to the tapering of another end of a leaf spring. The overall arrangement is such that substantially automatic and continuous tapering of leaf springs is afforded.

Another object of the invention is to provide apparatus of the character described which is ideally suited for effecting extremely long tapers on the ends of leaf springs and other like workpieces. As an example, tapers extending over a length of fifty inches are easily obtained with the present apparatus.

Yet another object of the invention resides in the provision of apparatus of the type above described which is adapted to effect symmetrical and unsymmetrical tapers on the leaf springs or other like workpieces. Means are employed for independently and quickly adjusting or altering the angle of taper effected upon the leaf spring ends and in this manner the ends of the leaf spring may be tapered as best suited for the intended use thereof.

In addition to the above, it is an object of the present invention to provide leaf spring tapering apparatus which embodies a confining anvil die for the reception of the leaf spring blank. The reducing rolls are received in nesting relation in the channel shaped anvil die whereby expansion of the leaf spring in any direction except longitudinally during tapering operations is prevented.

The above, as well as other objects and advantages of the invention, will become more readily apparent upon consideration of the following specification and accompanying drawings wherein there is disclosed a preferred embodiment of the invention.

In the drawing:

FIGURE 1, composed of FIGURES 1A and 1B, is fragmentary side elevational view of leaf spring tapering apparatus constructed in accordance with the teachings of the present invention;

FIGURE 2 is an end sectional view of the leaf spring tapering apparatus shown in FIGURE 1 taken along the section line II—II of FIGURE 1A;

FIGURE 3 is yet another end sectional view of the apparatus of FIGURE 1 taken along the section line III—III of FIGURE 1A;

FIGURE 4 is an enlarged fragmentary sectional view showing the means employed for mounting the cam carriage as seen from the section line IV—IV of FIGURE 1A;

FIGURE 5 is an enlarged fragmentary end sectional view taken along the section line V—V of FIGURE 1A;

FIGURE 6 is an enlarged side view showing specifically the carriage mounting a plurality of back-up rollers and pinion gears forming a portion of the cam carriage embodied in the apparatus of FIGURES 1A and 1B;

FIGURE 7 is an end elevational view of the structure shown in FIGURE 6; and

FIGURE 8 is a side view showing one of the reducing roll mounting carriages and the actuating apparatus therefor employed in the leaf spring tapering apparatus of FIGURES 1A and 1B.

Refering now to the drawing, and initially to FIGURES 1–3 thereof, there is shown apparatus for tapering leaf springs and other like workpieces constructed in accordance with the teachings of the present invention. The leaf spring tapering apparatus consists of a large rectangular rigid frame 10 defining a large center opening 11 which is constructed from elongated beam-like longitudinally extending top and bottom frame members 12 and 13, respectively, and laterally spaced pairs of vertically extending side frame members 14. The upper surface of the bottom frame member 13 serves as a supporting surface for a pair of longitudinally spaced anvil die supports 15 which have attached thereto a pair of upwardly directed channel shaped workpiece confining anvil dies 16. The channel-shaped anvil dies are positioned in aligned relation and are adapted to receive and confine the end portions of a leaf spring blank, not shown, during tapering operations.

Cooperating with the channel shaped anvil dies 16 in tapering the ends of a leaf spring are a pair of reducing rolls 17 and 18 which are rotatably journaled and carried by opposed reducing roll carriages 19 and 20. Each of the reducing roll carriages is guided between one pair of the laterally spaced side frame members 14 and is adapted for movement toward and away from the large center opening 11 in the frame. Mounted for longitudinally shuttling movement from the top frame member 12 is an elongated cam carriage 21 that in turn supports a pair of downwardly extending independently mounted cam back-up assemblies 22 and 23. Each of the cam back-up assemblies comprises a pair of wear resistant camming elements 24 which are held in properly angled relation with respect to the horizontal and are adapted to engage the integral cam follower shafts 25 projecting from opposite sides of the reducing rolls 17 and 18.

In general, the operation of the leaf spring tapering apparatus is that the cam carriage 21 is shuttled whereby the end portions of leaf spring blank are alternately tapered outwardly from the center thereof as the angled camming elements 24 engage and cause rolling movement of the reducing rolls 17 and 18. The amount of taper is, of course, controlled by the angular disposition of the camming elements 24 with respect to the flat surfaces of the channel shaped anvil dies 16. It will be noted that the reducing rolls 17 and 18 and the cam back-up assemblies 22 and 23 are so disposed and positioned that when the reducing roll 17 and cam back-up assembly 22 are adjacent the center of the leaf spring blank and are ready to roll the right end portion thereof upon movement of the cam carriage 21 to the right (as viewed in FIGURE 1A) that the reducing roll 18 and the back-up cam assembly 23 are positioned to the extreme left of the leaf spring blank. As the cam carriage is drawn to the right the reducing roll 17 will taper the right end of the leaf spring blank in accordance with the shape and angular disposition of the associated camming elements 24 while the reducing roll 18 will be moved toward its starting position adjacent the center of the leaf spring blank. After the right end portion is tapered the cam carriage 21 is moved to the left to its original position whereby the reducing roll 18 moves to the left under the influence of the camming elements carried by the cam back-up assembly 23 to taper the left end of the leaf spring blank. During this latter movement the reducing roll 17 and cam back-up assembly 22 will be returned to the position shown in FIGURES 1A and 1B of the drawing. Means are incorporated, as will be hereinafter more fully described, for moving the reducing rolls out of engagement with the leaf spring blank upon movement thereof from positions outwardly of the ends toward the center of the leaf spring blank. In this manner the ends of the leaf spring blank are tapered alternately upon shuttling movement of the cam carriage 21 whereby this carriage, the frame and the other component parts of the leaf spring tapering apparatus need only be of sufficient size and rigidity to withstand the forces involved in tapering one end of the leaf spring blank. During tapering operations the reducing rolls are received within and guided by the channel shaped anvil dies 16 so that the flow of metal during rolling is limited to the longitudinal direction and the original width dimension of the leaf spring blank is preserved. Of course, the taperng of leaf springs and other like workpieces is a hot metal working operation and the blanks are therefore heated to sufficient temperatures prior to being positioned within the anvil dies 16.

Considering now the construction of the shuttling cam carriage 21 which mounts the cam back-up assemblies 22 and 23, the top frame member 12 of the frame 10 is provided with a pair of laterally spaced and longitudinally extending hanger portions 27 which, in cooperation with the projecting ends of a transversely extending tie member 28 and a pair of wear resistant liners 29, define a pair of spaced parallel tracks 30 that, as will be observed in FIGURES 1A and 1B of the drawing, extend the length of the top frame member 12. Mounted for rolling movement on the tracks 30 are longitudinally spaced pairs of anti-friction type rollers 31 whose axles 32 are mounted in inwardly directed relation from the upstanding leg portions 33 of a generally U-shaped depending cam carriage frame 34. It should be apparent that the arrangement is such that the cam carriage frame 34, as well as all apparatus carried thereby, is adapted for accurately guided antifriction movement in the longitudinal direction by the plurality of anti-friction type rollers 31 and the spaced parallel tracks 30.

The cam carriage frame 34 is provided with two pairs of longitudinally spaced tubular bosses 35 on either side thereof which receive a plurality of vertically extending tie rods 37. The lower ends of the tie rods project through spaced tubular bosses 38 mounted on and rigidly attached to the sides of a longitudinally extending and properly formed cam assembly carrying member 39. The lower ends of the tie rods 37 threadably receive suitable nuts 40 and disposed in encircling relation with respect to the tie rods and positioned between the lower surfaces of the tubular bosses 38 and the nuts 40 are compression coil springs 41. The arrangement is such that the compression coil springs 41 urge the cam assembly carrying member 39 upwardly whereby this last mentioned member is resiliently carried by the cam carriage frame 34 as will be hereinafter more fully described.

The cam assembly carrying member 39 is of appreciable transverse cross section (see FIGURES 4 and 5) and mounts on elongated wear resistant plate 43 on the upper surface thereof and a pair of transversely spaced inserts at the outer edges thereof which have racks 44 formed on their upper surfaces. The wear plate 43 and the laterally spaced pair of elongated racks 44 are mounted in opposed relation with respect to a wear plate 45 and a pair of transversely spaced racks 46 attached in depending fashion to the rigid and stationary tie member 28 of the top frame member 12.

Positioned between the opposed wear plates 43 and 45 and the opposed sets of racks 44 and 46 is a force transmitting roll carriage 48 which is shown in detail in FIGURES 6 and 7 of the drawing. The force transmitting roll carriage 48 comprises an elongated generally rectangular frame 49 which journals the reduced diameter end portions 50 of a plurality of longitudinally spaced force transmitting rolls 51. Suitable transversely extending keeper plates and braces 52 are, of course, provided for adding rigidity to the rectangular frame 49 and retaining the spaced force transmitting rolls 51. Two of the force transmitting rolls 51 positioned near the ends of the rectangular frame 49 are each provided with a pair of annular bearings 54 adjacent the ends thereof which in turn journal the pinion gears 42 mounted thereon.

As intimated above, the force transmitting roll carriage 48 is inserted between the top frame member 12 and the cam assembly carrying member 39 for transferring the rolling forces exerted on this last mentioned member to the frame of the leaf spring tapering apparatus. The cam assembly carrying member 39 is provided with a pair of mounting clevises 55 on the opposite ends thereof which pivotally receive the ends of the piston rods of a pair of large diametered long stroke carriage shuttling fluid cylinders 56 and 57. These fluid cylinders are mounted between pairs of projecting supporting brackets 58 extending from the laterally spaced side frame members 14 whereby upon proper actuation of these carriage shuttling fluid cylinders the cam assembly carrying member, and all appurtenant apparatus carried thereby, is moved in shuttling relation above the channel shaped anvil dies 16. When these fluid cylinders are so actuated the cam assembly carrying member 39 will move and the cam carriage frame 34 will be carried therewith due to the resilient interconnection afforded between these two components by the tie rods 37 and compression coil springs 41. The cam carriage frame 34 and the cam assembly carrying member 39 are supported from the anti-friction type rollers 31 and therefore are easily and readily movable in an accurately guided manner with the anti-friction type rollers riding in the tracks 30.

As the cam assembly carrying member 39 moves, the wear plate 43 and the set of racks 44 carried thereby will also move therewith. The movement of the set of racks 44 causes the pinion gears 42 to rotate thereby moving the force transmitting roll carriage 48 in the same direction as the cam assembly carrying member 39 and the cam carriage frame 34. The force transmitting rolls 51 rotate independently of the pinion gears 42 and serve as a means for transferring the reactive forces exerted by the reducing rolls 17 and 18 during leaf spring tapering operations from the shuttling cam carriage 21 to the stationary frame 10. These reactive forces are transmitted to the cam assembly carrying member 39, the wear plate 43, across the plurality of force transmitting rolls 51, to the wear plate 45 and then to the tie member 28 forming a portion of the top frame member of the frame 10. This arrangement for supporting the cam assembly carrying member 39 is particularly advantageous since this last mentioned member is suspended for shuttling movement independently of the reactive forces encountered in the tapering of leaf springs or other like workpieces. Thus, the cam assembly carrying member is easily movable in a longitudinal direction with the anti-friction type rollers 31 riding in the tracks 30 while the forces are transmitted through the force transmitting rolls 51 independently thereof. The plurality of force transmitting rolls 51 further insures easy movement of the cam assembly carrying member 39 and provides large rolling contact areas for transmitting the high reactive forces involved. In addition, it will be noted that the cam assembly carrying member 39 is resiliently mounted from the cam carriage frame 34 whereby the compression coil springs 41 will always urge the wear plate 43 into contact with force transmitting rolls 51 and these rolls into contact with the wear plate 45. This desired condition will exist even when the wear plates or any of the force transmitting rolls become worn or when there is looseness or play in the various components of the leaf spring tapering apparatus.

The cam back-up assemblies 22 and 23 which carry the camming elements 24 are mounted in longitudinally aligned relation from the cam assembly carrying member 39. Each of the cam back-up assemblies is of similar construction and to avoid unnecessary repetition in the specification only one of these assemblies will be described in detail although the same reference numerals have been applied to similar component parts of these assemblies throughout the various views of the drawing.

The cam back-up assembly 22 comprises a camming element carrier 60 that mounts on the bottom surface thereof a pair of the transversely spaced and readily removable camming elements 24 which are adapted to have relative rolling contact with the integral cam follower shafts 25 of the reducing roll 17 during tapering operations. The camming element carrier 60 is attached to a generally rectangular carrier mounting block 61 which has the ends of four vertically extending supporting rods 62 pivotally attached thereto adjacent the ends thereof. The upper ends of the rods 62 are received within the generally U-shaped depending brackets 63 carried by the cam assembly carrying member 39 and are threaded to receive nuts defining enlarged head portions. Each of the rods 62 is encircled by a compression coil spring 64 extending between the upper surface of the bracket 63 and the nut associated therewith whereby the camming element carrier 60 and the carrier mounting block 61 are resiliently supported from the cam assembly carrying member 39. However, it will be noted that upward movement of the cam back-up assembly 22 is accurately limited as the headed ends of the rods 62 are forced against the cam assembly carrying member 39.

As set forth in the objects of the invention, means are provided for adjusting the amount of taper imparted to the end portions of a leaf spring blank or other like workpiece. In the present instance this is provided by attaching an accurately machined gib 66 of relatively short length to the upper surface of the carrier mounting block adjacent the outer end portion thereof. The gib provides a bearing surface for a wedge 67 which is interposed between the gib 66 and the lower surface of the cam assembly carrying member 39. The wedge 67 is transversely adjustable upon proper manipulation of an adjusting rod 68 to raise or lower the outer end of the cam back-up assembly 22 whereby the angular disposition of the camming elements will be changed so that the reducing roll 17 will be moved downwardly at an increased or decreased rate as it moves longitudinally along the end portion of a leaf spring blank or the like. Thus, each of the camming elements 24 is held in properly adjusted angled relation with respect to the plane of the channel shaped anvil dies for forcing the reducing roll associated therewith downwardly to provide the desired taper. It will be noted upon close inspection of the drawing that each of the camming elements is provided with upwardly beveled end surface portions 24a and 24b adjacent its inner and outer ends, respectively. This is of particular importance in accomplishing the objects of the present invention as will be hereinafter more fully explained.

As set forth above, the reducing rolls 17 and 18 are rotatably journaled and carried by opposed reducing roll carriages 19 and 20 which are of similar construction. Like reference numerals have been used to designate similar component parts of these roll carriages although only one of them will be described in detail in the following portion of the specification.

Referring now to FIGURES 1–3 and 8 of the drawing, the reducing roll carriage 19 comprises a generally rectangular frame having spaced side frame members 70 and transversely extending cross frame members 71. The reducing roll carriage is positioned between the vertically extending laterally spaced side frame members 14 at one end of the frame with the side frame members 70 of this carriage being received by and guided in the inwardly directed channel shaped guides 72 mounted on the inner opposing faces of the side frame members 14. In this manner the reducing roll carriage is adapted for inward and outward movement with respect to the center of the leaf spring tapering apparatus as is readily apparent. Pivotally mounted adjacent the front end of the side frame members 70 are a pair of bellcranks 73 whose forwardly projecting arms 74 journal the outermost small diametered end portions 75 of the reducing roll 17. The other arms 76 of the bellcrank project upwardly and have attached thereto the ends of a pair of chains 77 which extend rearwardly and are entrained around a pair of sprockets 78 journaled in depending mounting brackets 79 attached to the rear ends of the side frame members 70. The other sets of ends of the chains 77 are attached to rearwardly projecting rods 80 which are pivotally attached to the depending mounting brackets 79 and adjustably mount a pair of counterweights 82. The arrangement is such that the reducing roll 17 is biased upwardly whereby the cam follower shafts 25 engage the camming elements 24 at all times. Thus, when the cam follower shafts ride on the end portions 24b of the camming elements the reducing roll 17 will automatically be pivoted away from the channel shaped anvil die 16 and the leaf spring blank for reasons to be hereinafter more fully explained. Of course, during actual tapering operations, the cam back-up assembly 22 completely overrides the effect of the counterweights 82.

For positioning the reducing roll carriage 19 with respect to the cam back-up assembly 22 there is provided a long stroke fluid cylinder 83 which is mounted on a pedestal 84' attached to the end of cantilevered supporting bracket 85 extending from the side frame members 14 of the frame 10 of the leaf spring tapering apparatus. The fluid cylinder 83 has its piston rod 84 attached to the rear cross frame member 71 and is adapted to hold the reducing roll carriage 19 and consequently the reducing roll 17 until the cam follower shafts 25 are engaged by the camming elements 24 at the beginning of an actual tapering operation. Also adjustably mounted on the pedestal 84' is a forwardly extending and headed limit rod 86 which is slidably received in the reducing roll carriage. The arrangement is such that the extreme inner position of the reducing roll will be properly positioned with respect to the leaf spring blank at the beginning of a tapering operation.

The reducing roll 17 also has integrally extending shaft portions intermediate the reduced diametered outer end portions 75 and the integral cam follower shafts 25 thereof which are fitted with a plurality of sprockets 87. The sprockets 87 are entrained with chains 88 which have one set of ends thereof attached to the outer end of the camming element carrier 60 of the cam back-up assembly 22 and the other set of ends are entrained about sprockets 89 supported from the frame 10 and are attached to weights 90. In this manner, the reducing roll will be caused to follow the cam back-up assembly 22 in rolling movement along the workpiece as the cam back-up assembly moves to the right from the position shown in FIGURES 1A and 1B of the drawing.

The camming element carrier 60 of the cam back-up assembly 22 mounts an outwardly projecting hook 92 which is adapted to engage the forward cross frame member 71 of the reducing roll carriage at certain times for returning the reducing roll 17 to the position shown in FIGURES 1A and 1B of the drawing. The utilization of this apparatus will perhaps best be understood in connection with the preferred operation of my leaf spring tapering apparatus.

*Operation*

Considering now the operation of the above described apparatus, it should be remembered that a pair of reducing rolls, a pair of cam back-up assemblies, a pair of reducing roll carriages and pairs of other appurtenant equipage are provided for tapering both end portions of the leaf spring blank or other like workpiece. The component parts are so arranged that while one end portion is being tapered the apparatus for tapering the other end portion is being returned to its starting position. It will be assumed a spring leaf blank has been placed in the channel shaped anvil dies 16 and that the various component parts and assemblies of the leaf spring tapering apparatus are in the position shown in FIGURES 1A and 1B. At this time the reducing roll 17 is positioned above the upper surface of the blank out of contact therewith since the cam follower shafts 25 are engaging the outer tapered end portions 24b of the camming element 24. Of course, the wedges 67 of the cam back-up assemblies have been properly adjusted whereby the proper and desired tapers will be effected upon the ends of the leaf spring blank.

To start a tapering operation the fluid cylinder 56 and/or fluid cylinder 57 is actuated in such a manner to move the cam carriage 21 to the right while fluid is supplied to the cylinder 83 associated with the reducing roll carriage 19 to hold this carriage stationary until the camming elements 24 are moved relative to the reducing roll 17 whereby the main portions of the camming elements are engaged by the cam follower shafts to thereby pivot the reducing roll downwardly into contact with the blank. Then pressure is relieved from the fluid cylinder 83 in order that the right end of the spring is tapered as the reducing roll moves thereacross and relative movement is effected between the cam back-up assembly 22 and the reducing roll 17. Of course, the reducing roll 17 will be forced downwardly as the same moves outwardly in accordance with the angular disposition of the camming elements 24. Eventually the reducing roll will roll off the right end of the leaf spring blank and when this roll is at its outermost position the cam follower shafts will be closely adjacent the end portions 24a of the camming elements 24.

While the reducing roll 17 is moving to the right to taper the right end of the leaf spring blank the reducing roll 18 is being moved to a position adjacent the center of the blank whereby the same is adapted to taper the left end of the leaf spring blank upon reverse actuation of the cam carriage 21. This is accomplished by initially supplying fluid to the cylinder 83 associated with the reducing roll carriage 20 whereby the cam back-up assembly 23 moves to the right relative to the stationary reducing roll 18. The reducing roll is, of course, pivoted downwardly as the camming elements 24 are moved across the cam follower shafts 25 but since the reducing roll is positioned to one side of the leaf spring blank this pivotal movement is effected in an easy manner. As the cam carriage continues to move to the right the cam back-up assembly 23 will continue to override the reducing roll 19 until eventually the portions 24b of the camming elements are engaged by the cam follower shafts 25. At this time the reducing roll will be pivoted upwardly and the camming portions 24b are so formed that when the follower shafts engage the same the reducing roll 18 is pivoted upwardly to a position above the plane of the leaf spring blank. Eventually the hook 92 mounted on the cam back-up assembly 23 engages the forward cross frame member 71 of the reducing roll carriage 20 so that upon continued movement of the cam carriage 20 the reducing roll carriage 20 and the reducing roll 18 carried thereby will be moved with the cam back-up assembly to a starting position adjacent the center of the leaf spring blank. During movement of the reducing roll 18 the same is retained in its upwardly pivoted position out of contact with the leaf spring blank due to the engagement of the portions 24b by the cam follower shafts 25. The provision of the portions 24b on the various pairs of camming elements is particularly important in accomplishing the objects of the present invention in that it allows one of the reducing rolls to be returned to its starting position while the other reducing roll is tapering one end of the leaf spring blank.

At this time the right end portion of the leaf spring blank has been tapered and the reducing roll 17 is positioned to the right side of the blank adjacent the portions 24a of the camming elements carried by the cam back-up assembly 22. Also, the reducing roll 18 is positioned adjacent the center of the leaf spring blank with the cam follower shafts 25 engaging the portions 24b of the camming elements carried by the cam back-up assembly 23. To complete the tapering operation the cam carriage 21 is moved to the left upon proper actuation of the fluid cylinder 56 and/or fluid cylinder 57 back to the position shown in FIGURES 1A and 1B of the drawing. During this return movement the left end of the leaf spring blank will be properly tapered by the reducing roll 18 while the reducing roll 17 is moved toward the center of the leaf spring blank. Eventually all of the component parts will be returned to the positions shown in FIGURES 1A and 1B and both end portions of the leaf spring blank will have been properly tapered. Since each of the end portions of the leaf spring blank is tapered by an independent reducing roll and cam back-up assembly it is entirely possible to effect symmetrical or unsymmetrical tapers on the leaf spring blank upon proper relative adjustment of the wedges 67 in order that the finished product will have tapered end portions best adapted for its intended use. The tapered leaf spring blank can now be removed and a new blank positioned within the channel shaped anvil dies 16 and it will be noted that loading and unloading of the leaf spring tapering apparatus is easily accomplished since the reducing roll 17 is pivoted upwardly and the reducing roll 18 is positioned to one side of the blank.

The leaf spring tapering apparatus is thus adapted to taper the end portion of a leaf spring blank upon each shuttling movement of the cam carriage 21 and it will be apparent that the apparatus is ideally suited to be employed with automatic control equipment and automatic loading and unloading apparatus whereby extremely high rates of production are obtained. Although the apparatus has been described as being used in the tapering of single leaf springs it should be clearly understood that the teachings of the invention are applicable to other like products and workpieces wherein a tapered portion is desired.

It should thus be apparent that I have accomplished the objects initially set forth. Although I have described and shown a preferred illustrated embodiment of the invention, many changes may be made therein without departing from the teachings of the present invention. Accordingly, reference should be had to the following appended claims in determining the true scope and intent of the present invention.

I claim:

1. Apparatus for tapering the end portions of elongated leaf springs and the like comprising a rigid frame having an opening therein, an elongated anvil die extending along one wall of said opening and adapted to support an elongated metal blank, a track on said frame extending along an opposite side wall of said opening in generally parallel relation to said anvil die, said track having a surface facing away from said anvil die and another surface facing said anvil die, a carriage mounting a plurality of anti-friction rollers for engaging said outwardly facing surface of said track and said carriage also including an elongated member having a flat surface facing the second mentioned surface of said track, an assembly comprising an open frame mounting a plurality of force transmitting rolls which are interposed between the facing surfaces of said track and carriage, a cam member adjustably and pivotally mounted on said elongated member and having its camming surface facing said anvil die, power means to move said carriage longitudinally along said track, and a reducing roll mounted for contact both with said cam face and with the blank held in said die to roll down said blank upon longitudinal movement of said carriage.

2. Apparatus according to claim 1 further characterized in that said open frame of said assembly is rectangular in plan and in that said force transmitting rolls are journaled at their ends in side rails of said open frame, a pair of transversely spaced but longitudinally extending racks mounted on said track and a similar pair of racks mounted on said carriage facing said first pair of racks, and pinions interposed between said racks and adjacent the said side rails of said open frame and having their axes fixed in longitudinal relation to said side rails whereby said side rails are restrained against relative longitudinal movement.

3. Apparatus for taper rolling metal blanks comprising a support, an elongate stationary bed on said support for mounting a blank to be rolled, a carriage mounted on said support for longitudinal reciprocal movement above said bed, an elongate taper control cam means, means mounting said taper control cam means on the bottom of said carriage disposed longitudinally above said elongate bed, a freely rotatable forming roller adapted to be located between said cam means and the upper surface of the blank to be rolled, a roller mounting member freely pivoted on said support on an axis parallel to the roller axis and movement transverse to the roller axis, means operatively connected to said member for selectively shifting said roller in the direction of movement of said carriage, means for moving said carriage in one direction to operatively engage said cam means into a rolling contact engagement with said roller and urge the roller into rolling contact under high pressure with the upper surface of said blank, and shiftable means driven by said carriage directly effective on said roller irrespective of roller position during said movement of the carriage to enable a positive pure rolling of said roller on said cam means to assure that said roller roll forms said upper surface of the blank, said cam means comprising two overhead parallel, laterally spaced apart elongate cam tracks; said forming roller comprising an intermediate cylindrical forming surface, a cylindrical cam engaging surface on each side of said forming surface and at least one sprocket toothed wheel the pitch circle of which is equal to the circumference of said cam following surfaces located at one side of one of said cam engaging surfaces, said cylindrical surfaces and said toothed wheel being relatively non-rotatable and coaxial on the roller axis; and said shiftable means comprising at least one sprocket chain secured at one end to said cam means, passing from said one end in a first direction opposite to the said one direction of said carriage and passing around a portion of and drivingly meshed with the teeth of said sprocket wheel, and means engaging said chain to create a biased slack absorbing force on said chain.

4. Apparatus for reducing the end portions of a longitudinally extending and elongated metal blank which comprises a frame, anvil die means mounted on said frame for supporting said blank, a pair of longitudinally aligned and spaced reducing rolls for rolling opposite end portions of said blank, a pair of longitudinally aligned but oppositely inclined cam means for backing up said reducing rolls, a carriage for said cam means mounted for longitudinal movement on said frame, means for effecting relative longitudinal movement between said carriage and frame, one of said reducing rolls reducing one end portion of said blank upon relative longitudinal movement of said carriage in one direction while the other of said reducing rolls is out of engagement with respect to the other of said end portions, and said other of said reducing rolls reducing said other end of said blank upon relative longitudinal movement in the opposite direction while said one of said reducing rolls is out of engagement with respect to said one of said end portions.

5. Apparatus according to claim 4 further characterized in that each of said cam means comprises a longitudinally extending and tapered camming element, each of said camming elements having a relieved portion adjacent one of its ends, means biasing said reducing rolls into engagement with said camming elements, and said relieved portion on each of said camming elements being such that the reducing roll associated therewith is out of engagement with respect to said blank when said reducing roll is in engagement with said relieved portion.

6. Apparatus for reducing the end portions of a longitudinally extending and elongated metal blank which comprises a frame, anvil die means mounted on said frame for supporting said blank, a pair of longitudinally aligned and spaced reducing rolls, each of said reducing rolls being adapted to reduce one end portion of said metal blank, a pair of longitudinally aligned cam means for backing up said reducing rolls, a carriage for said cam means mounted for longitudinal movement on said frame, means to effect longitudinal movement between said carriage and frame, one of said reducing rolls reducing one end portion of said blank when said reducing roll is moved longitudinally outward from the center portion of said blank upon actuation of said means for effecting relative longitudinal movement in one direction, means to move the other of said reducing rolls to said center portion of said blank during said relative longitudinal movement in said one direction, said other end portion of said blank being reduced by said other reducing roll upon actuation of said means to effect longitudinal movement in the opposite direction, and means to move said one of said reducing rolls to a point adjacent said center portion of said blank during movement of the carriage in said opposite direction.

7. Apparatus according to claim 6 further characterized in that each of said cam means comprises a longitudinally extending camming element having a relieved portion adjacent one end thereof, means biasing said reducing rolls into engagement with said camming elements, and said relieved portions being such that said blank is not engaged by said reducing rolls while the same engage said relieved portions of said camming elements.

8. Apparatus according to claim 7 further characterized in that said relieved portions of said camming elements are disposed adjacent the outer opposite ends of said camming elements.

9. Apparatus according to claim 7 further comprising an abutment surface carried by each of said cam means, means movably mounting each of said reducing rolls on said frame, and said abutment surface engaging said means movably mounting when said reducing roll associated therewith engages said relieved portion of said camming element to return said reducing roll to said center portion of said blank.

10. Apparatus according to claim 7 further comprising means movably mounting each of said reducing rolls, said means movably mounting comprising a longitudinally extending rectangular frame guided for longitudinal movement in said frame, a pair of transversely spaced bellcranks pivotally mounted at one end of said rectangular frame, said reducing roll spanning and journaled by one set of arms of said bellcranks, counterweight means attached to the other arms of said bellcranks for biasing said reducing roll against said cam means, and a power device connected to the other end of said rectangular frame for longitudinally moving the same.

References Cited in the file of this patent

UNITED STATES PATENTS

| | | |
|---|---|---|
| 35,130 | Vanstone | Apr. 29, 1862 |
| 1,045,022 | Hauberg | Nov. 19, 1912 |
| 1,967,787 | Seiferth | July 24, 1934 |
| 2,775,152 | Krause | Dec. 25, 1956 |

FOREIGN PATENTS

| | | |
|---|---|---|
| 720.076 | Germany | Apr. 23, 1942 |